United States Patent
Inoko (10) Patent No.: US 11,844,161 B2
(45) Date of Patent: Dec. 12, 2023

(54) STAGING APPARATUS, STAGING SYSTEM, AND STAGING METHOD

(71) Applicant: TEAMLAB INC., Tokyo (JP)

(72) Inventor: Toshiyuki Inoko, Tokyo (JP)

(73) Assignee: TeamLab Inc., Tokyo (JP)

( * ) Notice: Subject to any disclaimer, the term of this patent is extended or adjusted under 35 U.S.C. 154(b) by 208 days.

(21) Appl. No.: 16/768,079

(22) PCT Filed: Nov. 28, 2018

(86) PCT No.: PCT/JP2018/043749
§ 371 (c)(1),
(2) Date: Feb. 8, 2022

(87) PCT Pub. No.: WO2019/107399
PCT Pub. Date: Jun. 6, 2019

(65) Prior Publication Data
US 2022/0256677 A1    Aug. 11, 2022

(30) Foreign Application Priority Data

Nov. 30, 2017  (JP) ................ 2017-230919

(51) Int. Cl.
*H05B 47/10* (2020.01)
*H05B 47/19* (2020.01)
(Continued)

(52) U.S. Cl.
CPC ......... *H05B 47/10* (2020.01); *F21V 33/0052* (2013.01); *G06F 3/165* (2013.01);
(Continued)

(58) Field of Classification Search
CPC ..... H05B 47/10; H05B 47/19; F21V 33/0052; F21V 3/02; F21V 33/00; F21V 99/00;
(Continued)

(56) References Cited

U.S. PATENT DOCUMENTS 4,931,029 A * 6/1990 Hwang ................ A63H 15/06
446/175
6,238,067 B1 * 5/2001 Hirsch .................. F21V 23/04
362/399
(Continued)

FOREIGN PATENT DOCUMENTS

CN        85109702 A     9/1986
CN       102714003 A    10/2012
(Continued)

OTHER PUBLICATIONS

Office Action of Taiwanese application No. 107142416 dated Feb. 25, 2022 (8 pages).
(Continued)

*Primary Examiner* — Bao Q Truong
(74) *Attorney, Agent, or Firm* — Pyprus Pte Ltd; George D. Liu (57) ABSTRACT

To more effectively perform staging using light and sound. A staging apparatus 1 is provided with a ball 2 in which a gas is contained, and an internal device 200 including a sound output unit 270 and a light-emitting unit 240 provided in the ball 2. In the internal device 200, sound is outputted from the sound output unit 270 when an operation of the ball 2 is sensed. The staging apparatus 1 preferably receives, from an external control device or the like, a synchronization signal for synchronizing the timing at which sound is output, and outputs sound at a timing that is in accordance with the synchronization signal.

8 Claims, 6 Drawing Sheets

(51) Int. Cl.
*F21V 33/00* (2006.01)
*G06F 3/16* (2006.01)
*F21Y 115/10* (2016.01)
*F21W 131/406* (2006.01)

(52) U.S. Cl.
CPC ....... *H05B 47/19* (2020.01); *F21W 2131/406* (2013.01); *F21Y 2115/10* (2016.08)

(58) Field of Classification Search
CPC ................ G06F 3/165; F21Y 2115/10; F21W 2131/406; A63H 5/00; A63H 15/06; A63H 27/10; A63H 30/04; A63H 33/00; A63H 33/22; F21S 2/00
See application file for complete search history.

(56) References Cited

U.S. PATENT DOCUMENTS

| | | | | |
|---|---|---|---|---|
| 9,307,618 | B2* | 4/2016 | Tsang | H05B 47/18 |
| 9,498,734 | B2* | 11/2016 | Bo | A63H 27/10 |
| 2004/0116039 | A1* | 6/2004 | Mueller | F21V 23/04 446/220 |
| 2005/0272343 | A1* | 12/2005 | Lee | B44C 5/005 446/71 |
| 2006/0291217 | A1* | 12/2006 | Vanderschuit | A63H 33/22 362/363 |
| 2013/0233964 | A1 | 9/2013 | Woodworth et al. | |
| 2014/0235135 | A1* | 8/2014 | Henrik | F21V 3/023 446/220 |

FOREIGN PATENT DOCUMENTS

| | | |
|---|---|---|
| CN | 202868560 U | 4/2013 |
| GB | 2510818 A | 8/2014 |
| JP | 8-168545 A | 7/1996 |
| JP | U3090215 | 9/2002 |
| JP | 3090215 U | 11/2002 |
| JP | 2005-168438 A | 6/2005 |
| JP | 2011-130979 A | 7/2011 |
| JP | 2015-2958 A | 1/2015 |
| JP | 2017-134683 A | 8/2017 |

OTHER PUBLICATIONS

Office Action of Japanese application No. 2017-230919 dated Jul. 15, 2021 (6 pages).
International Search Report of International Patent Application No. PCT/JP2018/043749 completed Feb. 13, 2019 and dated Feb. 26, 2019 (4 pages).
Written Opinion of International Patent Application No. PCT/JP2018/043749 completed Feb. 13, 2019 and dated Feb. 26, 2019 (6 pages).
Mar. 12, 2017 [retrieval date Feb. 8, 2019], Internet: <URL https://hobby.dengeki.com/news/349493/>, non-official translation (Hold! Get set! Shoot! A new toy that can provide experience "KAME HAME HA" while moving and playing, [online]).
Office Action of Chinese application No. 201880072266.3 dated Nov. 24, 2021 (11 pages).
"Multimedia Communication Programming Technology", Song et al., published on Oct. 1998, pp. 89-90.
Extended European Search Report of European application No. 18884062.3 dated Jun. 7, 2021 (5 pages).

* cited by examiner

STAGING APPARATUS, STAGING SYSTEM, AND STAGING METHOD

TECHNICAL FIELD

The present invention relates to a staging apparatus, a staging system, and a staging method using light and sound. Specifically, the present invention relates to the staging apparatus configured by equipping a lighting device and a speaker inside a ball or a swing body, or the like.

BACKGROUND ART

Conventionally, as lighting staging performed in an event, such as a concert and a live concert, there has been proposed a method in which light emission control devices including LEDs are mounted inside a plurality of balls (balloons) containing a gas, and while the LEDs inside the respective balls are synchronized, emitted light colors of the LEDs are changed (Patent Document 1). For example, Patent Document 1 discloses that the emitted light color of the LED is changed when the light emission control device inside the ball senses a movement of the ball, or in accordance with a movement of a certain ball, the LEDs in the plurality of other balls are concurrently changed.

The balls including the LEDs freely float over heads of spectators, for example, inside an event venue. When the spectator tosses and throws the ball, acceleration of the movement or the like is sensed, and thus the emitted light color changes in real time. Accordingly, not only enjoying lighting staging by the light emission of the ball, the spectator can also enjoy freely moving the ball. Nowadays, the interactive lighting staging thus using the ball that emits light has been popular.

Patent Document 1: JP-A-2011-130979

DISCLOSURE OF THE INVENTION

Problems to be Solved by the Invention

In the above-described lighting staging system, it has been examined that a speaker outputs a sound effect or the like in conjunction with the emission of light of the ball for staging using light and sound. Usually, a plurality of speakers are installed in an event venue, and it is conceivable that the sound effect is output from the speaker in the venue when the spectator tosses a certain ball. However, even when the sound effect is output from the speaker in the venue, there is a problem that the spectator who has tossed the ball is less likely to recognize a relevance between the operation of the ball and the sound effect, and the spectator is less likely to notice that the sound effect is output caused by the operation of himself/herself. Especially, in a case where a large number of spectators and a plurality of balls are present in the venue, the above-described problem becomes more remarkable.

Therefore, an object of the present invention is to ensure further effective staging using light and sound.

Solutions to the Problems

As a result of serious examinations on means to achieve the object, the inventor of the present invention has obtained the following knowledge. By mounting both of a light-emitting unit and a sound output unit to an inside of a ball (or a hollow swing body like a self-righting doll), staging using light and sound can be further effectively performed. The inventor has considered that further attractive staging can be achieved based on the above-described knowledge, and thus the present invention has been completed. Specifically, the present invention has the following configurations and steps.

A first aspect of the present invention relates to a staging apparatus using a ball. The staging apparatus according to the first aspect includes the ball and an internal device. The ball contains a gas. The internal device that includes a light-emitting unit and a sound output unit is disposed in the ball. When the light-emitting unit emits light, the (transparent or semitransparent) ball is lit from an inside of the ball. When the sound output unit outputs a sound effect or the like, spectators or the like present around the ball catch the sound. Note that although the internal device is preferably included in the ball, at least the light-emitting unit and the sound output unit only need to be disposed in the ball, and other devices (for example, a power supply) constituting the internal device may be disposed outside the ball. Thus disposing both of the light-emitting unit and the sound output unit inside the ball allows more effectively providing staging effect of outputting the sound from the inside of the ball to the spectators present around the ball, in addition to staging effect of emitting the light of the ball. Especially, since the sound is output from the ball actually touched by the spectator, an interest of the spectator can be further strongly attracted.

The staging apparatus of the present invention is preferably configured as follows. The internal device further includes an operation sensing unit and a sound control unit. The operation sensing unit is configured to sense an operation of the ball. The sound control unit is configured such that when the operation sensing unit senses the operation of the ball, the sound control unit outputs the sound from the sound output unit. Thus outputting the sound according to the operation of the ball allows the spectator to be able to enjoy touching the ball. The staging apparatus may be configured as follows. The staging apparatus further includes a light emission control unit configured such that when the operation sensing unit senses the operation of the ball, the light emission control unit changes a light emission state of the light-emitting unit. With this configuration, when the spectator touches the ball, for example, the sound effect is output from the ball simultaneously with the emission of the light of the ball, thus ensuring further enjoyment for the spectators.

The staging apparatus of the present invention is preferably configured as follows. The internal device further includes a wireless communication unit (wireless communication device). The wireless communication unit is configured to receive control information of the light-emitting unit or the sound output unit transmitted from an external control device or another staging apparatus. In this case, the light-emitting unit or the sound output unit emits the light in accordance with the control information received from the external control device or the other staging apparatus. That is, the external control device (computer) as a master machine may control the light emission state of the staging apparatus, or a plurality of the staging apparatuses may mutually give and receive the control information by a peer-to-peer method. Thus disposing the wireless communication unit in the staging apparatus remarkably improves a degree of freedom of staging using the light and the sound.

The staging apparatus of the present invention is preferably configured as follows. The control information received from the external control device or the other staging apparatus includes a synchronization signal to synchronize timings at which the sound output units output sounds. For example, in a case where the plurality of staging apparatuses are present in an event venue, when the respective balls uniquely output the sounds at timings at which the spectators hit the balls, the sounds output from the respective balls are mixed in the venue, resulting in a non-uniform acoustic effect uncomfortable to listen. Therefore, with the present invention, outputting the sounds by the respective staging apparatuses based on the synchronization signal allows the respective staging apparatuses to output the sounds at a uniform timing.

The staging apparatus of the present invention is preferably configured as follows. The ball includes a gas chamber and a device chamber. The gas chamber has an air hole for injecting a gas. The device chamber is separated from the gas chamber and includes the internal device. Especially, a part of the device chamber other than an opening to take out or take in the internal device is preferably surrounded and present by the gas chamber. Thus, the device chamber and the gas chamber are separated and the gas chamber surrounds the most part of the device chamber. This allows protecting the internal device housed in the device chamber against an impact when the spectator hits or tosses the ball. In view of this, a failure in the internal device can be suppressed. Note that the ball with such a structure is also effective to a case where the internal device inside the ball does not include the sound output unit but includes only the light-emitting unit. Here, "separated" means an extent that at least the internal device is separated such that between the gas chamber and the device chamber is configured so as not to freely come and go. For example, even when a ventilation hole is formed in a partition wall separating the internal device from the gas chamber, it can be said that both are isolated.

A second aspect of the present invention relates to a staging apparatus using a swing body like a self-righting doll. The staging apparatus according to the first aspect includes a swing body and an internal device. The swing body has a bowl-shaped bottom surface and a weight member disposed on an inner side of the bottom surface. Note that the bottom surface of the swing body serves as a ground surface to a floor and a ground. Accordingly, the swing body rises up with the bottom surface as the lower side even when falling over, like the self-righting doll. The internal device includes a light-emitting unit and a sound output unit disposed in the swing body. Thus, when the light-emitting unit emits the light, the (transparent or semi-transparent) swing body is lit from an inside of the swing body. When the sound output unit outputs the sound effect or the like, the spectators or the like present around the swing body catch the sound. Note that although the entire internal device is preferably included in the swing body, at least the light-emitting unit and the sound output unit only need to be included in the swing body, and other devices (for example, the power supply) constituting the internal device may be disposed outside the swing body. By thus equipping the light-emitting unit and the sound output unit inside the swing body allows providing the innovative staging apparatus that swings, for example, when being pushed by the spectator. Additionally, with the staging apparatus of the present invention, since the bottom surface of the swing body basically contacts the floor and the ground, the staging apparatus can be preferably used for outdoor lighting staging.

The staging apparatus of the present invention is preferably configured as follows. The internal device further includes an operation sensing unit and a sound control unit. The operation sensing unit is configured to sense an operation of the swing body. The sound control unit is configured such that when the operation sensing unit senses the operation of the swing body, the sound control unit outputs the sound from the sound output unit. Thus outputting the sound according to the operation of the swing body allows the spectator to give a joy to touch the swing body. The staging apparatus may be configured as follows. The staging apparatus further includes a light emission control unit configured such that when the operation sensing unit senses the operation of the swing body, the light emission control unit changes the light emission state of the light-emitting unit. With this configuration, when the spectator touches the swing body, for example, the sound effect is output from the swing body simultaneously with the emission of the light of the swing body, thus ensuring further enjoying the spectators.

The staging apparatus of the present invention is may be configured as follows. The operation sensing unit includes an acceleration sensor. The acceleration sensor is configured to measure acceleration of the operation of the swing body. In this case, the light emission control unit preferably changes the light emission state of the light-emitting unit when the acceleration of the operation of the swing body exceeds a certain threshold. In view of this, for example, when a strong impact is applied to the swing body, like the case where the spectator strongly pushes the swing body, the light emission state of the light-emitting unit changes. Additionally, the light emission state can be controlled so as not to be changed when the swing body slowly swings by, for example, wind.

The staging apparatus of the present invention may be configured as follows. The operation sensing unit includes a tilt sensor. The tilt sensor is configured to measure a tilting angle of the swing body. In this case, even when the acceleration of the operation of the swing body exceeds the certain threshold, the light emission control unit may be configured so as not to change (cancel the change in the light emission state) the light emission state of the light-emitting unit when the tilting angle of the swing body is in a certain angle range. For example, there may be a case when the spectator strongly pushes an upper portion of the swing body, the swing body receives the first impact by the pushing operation by the spectator, and when the swing body contacts the ground after that, the swing body receives the second impact. In such a case, control that changes the light emission state when the first impact is received from the spectator and does not change the light emission state when the second impact due to the contact with the ground is received is possible.

The staging apparatus of the present invention may be configured as follows. The operation sensing unit includes the tilt sensor. The tilt sensor is configured to measure the tilting angle of the swing body. In this case, the light emission control unit may change the light emission state of the light-emitting unit according to the tilting angle of the swing body. In view of this, for example, the lighting staging in which the light emission state (an emitted light color and emission intensity) of the light-emitting unit gradually transitions by a swing operation of the swing body is possible.

A third aspect of the present invention relates to a staging system. A device system of the present invention includes the staging apparatuses (including the balls or the swing bodies) according to the first aspect or the second aspect and a control device. The control device is configured to control the staging apparatuses. The control device is configured to transmit a synchronization signal to synchronize timings at which the sounds are output from the sound output units to the staging apparatuses. The staging apparatuses are configured such that when the operation sensing units sense the operations of the balls or the swing bodies, the staging apparatuses output the sounds from the sound output units at a timing based on the synchronization signal. By thus controlling the timings at which the sounds are output from the plurality of staging apparatuses, even when the plurality of staging apparatuses are present in the same venue, a mixture of the sounds from the respective staging apparatuses is avoided and therefore a uniform acoustic effect comfortable to listen can be provided. Especially, when an external speaker disposed in the venue outputs Back Ground Music (BGM) and the respective staging apparatuses output the Sound Effects (SEs) according to Beats Per Minute (BPM) same as that of the BGM, music unified in the entire venue can be played.

A fourth aspect of the present invention relates to a staging method. The staging method of the present invention is performed by the staging apparatuses (including the balls or the swing bodies) according to the first aspect or the second aspect and a control device. The control device controls the staging apparatuses. The staging method of the present invention includes: a step of transmitting a synchronization signal to synchronize timings at which the sounds are output from the sound output units by the control device to the staging apparatuses; and a step of outputting the sounds from the sound output units by the respective staging apparatuses at a timing based on the synchronization signal when the operation sensing units sense the operations of the balls or the swing bodies.

Advantageous Effects of the Invention

With the present invention, the staging using the light and the sound can be more effectively performed.

DESCRIPTION OF PREFERRED EMBODIMENTS

The following describes a configuration to embody the present invention using the drawings. The present invention is not limited to the configurations described in the following and also includes a configuration appropriately changed within a range where it is obvious for those skilled in the art from the following configurations.

Figure 1:
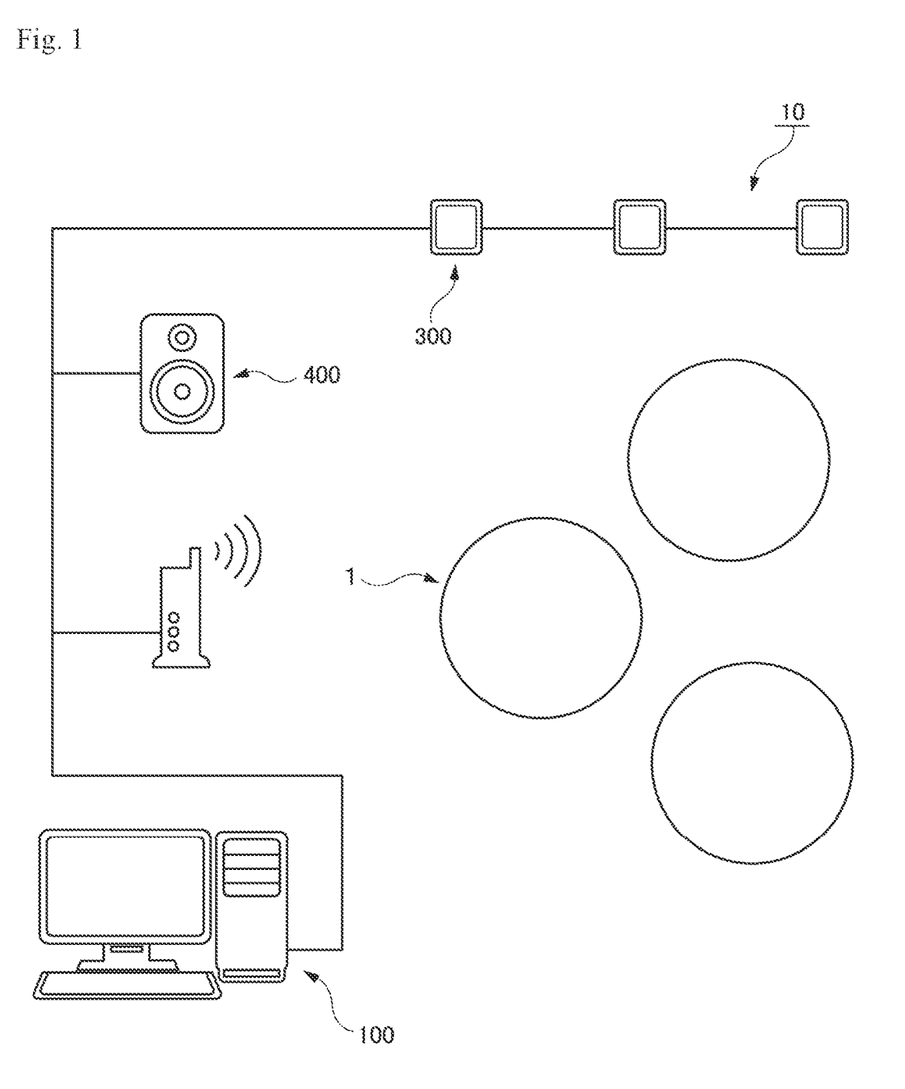
FIG. 1 schematically illustrates various devices provided with a staging system.
Figure 2:
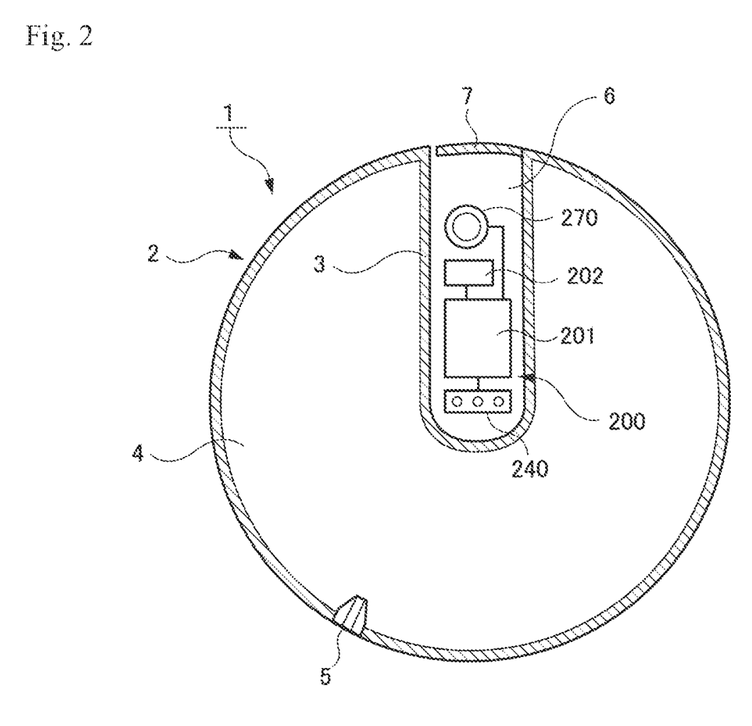
FIG. 2 schematically illustrates a cross-sectional structure of a ball type staging apparatus.

FIG. 1 illustrates an overall configuration of a staging system 10 according to an embodiment of the present invention. As illustrated in FIG. 1, the staging system 10 includes a plurality of staging apparatuses 1, a control device 100, a plurality of wireless signal receivers 300, and an external speaker 400. FIG. 2 schematically illustrates a cross-sectional structure of a lighting device 1. As illustrated in FIG. 2, in this embodiment, the staging apparatuses 1 each include a hollow ball 2 and an internal device 200 mounted to an inside of the ball 2. The inside of the ball 2 is filled with a gas, such as air and nitrogen, and the ball 2 freely floats (moves) an inside of an event venue.

The control device 100 is a computer that controls the entire system. The internal device 200 is a device that is configured by including a light-emitting unit 240, such as a LED, and a sound output unit 270, such as a speaker, inside of the ball 2 and basically performs control to drive the light-emitting unit 240 and the sound output unit 270. The internal devices 200 are mounted to the plurality of respective balls 2. In this embodiment, the internal device 200 transmits a short-distance wireless signal (what is called beacon) including self-specific identification information. The wireless signal receiver 300 receives the wireless signal from the internal device 200. When the wireless signal receiver 300 receives the wireless signal from the internal device 200, the wireless signal receiver 300 measures received intensity of the wireless signal. The control device 100 or the wireless signal receiver 300 measures a distance from the wireless signal receiver 300 to the internal device 200 based on the received intensity of the wireless signal from the internal device 200. In view of this, the control device 100 can grasp a positional coordinate in a space of the internal device 200 (namely, the staging apparatus 1) in real time.

The plurality of staging apparatuses 1 including the balls 2 and the internal devices 200 and the plurality of wireless signal receivers 300 are each disposed in the event venue. The event venue is not especially limited and may be indoor or may be outdoor. Positions of the plurality of wireless signal receivers 300 are fixed, and unique identification information (ID number) is assigned for each wireless signal receiver 300. The control device 100 has already known the positional coordinates of the wireless signal receivers 300 in the event venue (space). The control device 100 associates the positional coordinate of each wireless signal receiver 300 with the identification information and stores the positional coordinate, and therefore the control device 100 grasps which device is positioned at which coordinate.

As illustrated in FIG. 2, the ball 2 is a hollow spherical body internally containing a gas, such as air, nitrogen, and helium, and is made of flexible, elastic material that is transparent or semitransparent such that light irradiated from the inside transmits. Examples of the material forming the ball 2 include silicone and synthetic rubber. A size of the ball 2 is not especially limited, and the ball 2 only needs to have the size that the ball 2 can internally include the internal device 200. For example, the ball 2 has a diameter of from 0.1 m to 5 m, preferably has the diameter of from 0.5 to 3 m, or especially preferably has the diameter of from 1 m to 2.5 m. In this system, the ball 2 that is made of a comparatively lightweight material and can freely float over heads of spectators in the event venue for hang time to some degree is recommended. Additionally, the number of balls 2 to the extent that the balls 2 can crowd to some extent is preferably disposed in the venue according to the size of the event venue. For example, with balls B of 1 m to 2.5 m in diameter, one or more balls B are preferably present per 20 $m^2$ or 10 $m^2$, and one or more balls B are especially preferably present per 5 $m^2$ or 1 $m^2$. Note that in the internal device 200, at least the light-emitting unit 240 and the sound output unit 270 only need to be disposed inside the ball 2 and the other devices may be disposed outside the ball. However, to reduce a failure and coming-off of the internal device 200, including the entire internal device 200 inside the ball 2 is preferred.

Additionally, as illustrated in FIG. 2, the ball 2 has the internal space separated into a gas chamber 4 and a device chamber 6 by a partition wall 3. That is, the gas chamber 4 is a room filled with air, such as air and nitrogen, and an air hole 5 is provided in an outer film constituting the ball 2. The gas inside the gas chamber 4 can be emitted to the outside of the ball 2 via this air hole 5. The inside of the gas chamber 4 can be filled with a gas via the air hole 5. The air hole 5 preferably includes a check valve to avoid the gas inside the gas chamber 4 to easily leak. The partition wall 3 extends from the outer film constituting the ball 2 to the center of the ball 2. The partition wall 3 preferably reaches at least up to the center of the ball 2 such that the light-emitting unit 240 can be disposed on the approximately center of the ball 2. The internal device 200 is disposed inside the device chamber 6. The internal device 200 includes a board 201 on which, for example, a CPU and a control circuit, various memories, and various sensors are mounted, a battery 202, the light-emitting unit 240, such as a LED, and the sound output unit 270, such as a speaker. The device chamber 6 has a space sufficient to house the internal device 200, and the internal device 200 is fixed to the partition wall 3 or the like forming the device chamber 6. Additionally, the device chamber 6 forms an opening from which the internal device 200 can be taken out or taken in, and the opening is covered with a lid portion 7 in a usual state. The lid portion 7 can be mounted to the outer film of the ball 2 with, for example, a hook-and-loop fastener or a button. By covering the opening in the device chamber 6 by the lid portion 7, directly viewing the internal device 200 from the outside is difficult.

Additionally, in the ball 2, the peripheral area of the device chamber 6 is surrounded by the gas chamber 4 excluding the part where the opening is formed. Accordingly, the internal device 200 inside the device chamber 6 is protected from, for example, an external impact by this gas chamber 4. The gas chamber 4 preferably occupies from 60% to 95% or from 80% to 95% to a volume of the entire ball 2 (a sum of volumes of the gas chamber 4 and the device chamber 6). Thus, surrounding the device chamber 6 by the gas chamber 4 allows suppressing a failure in the internal device 200.

Figure 3:
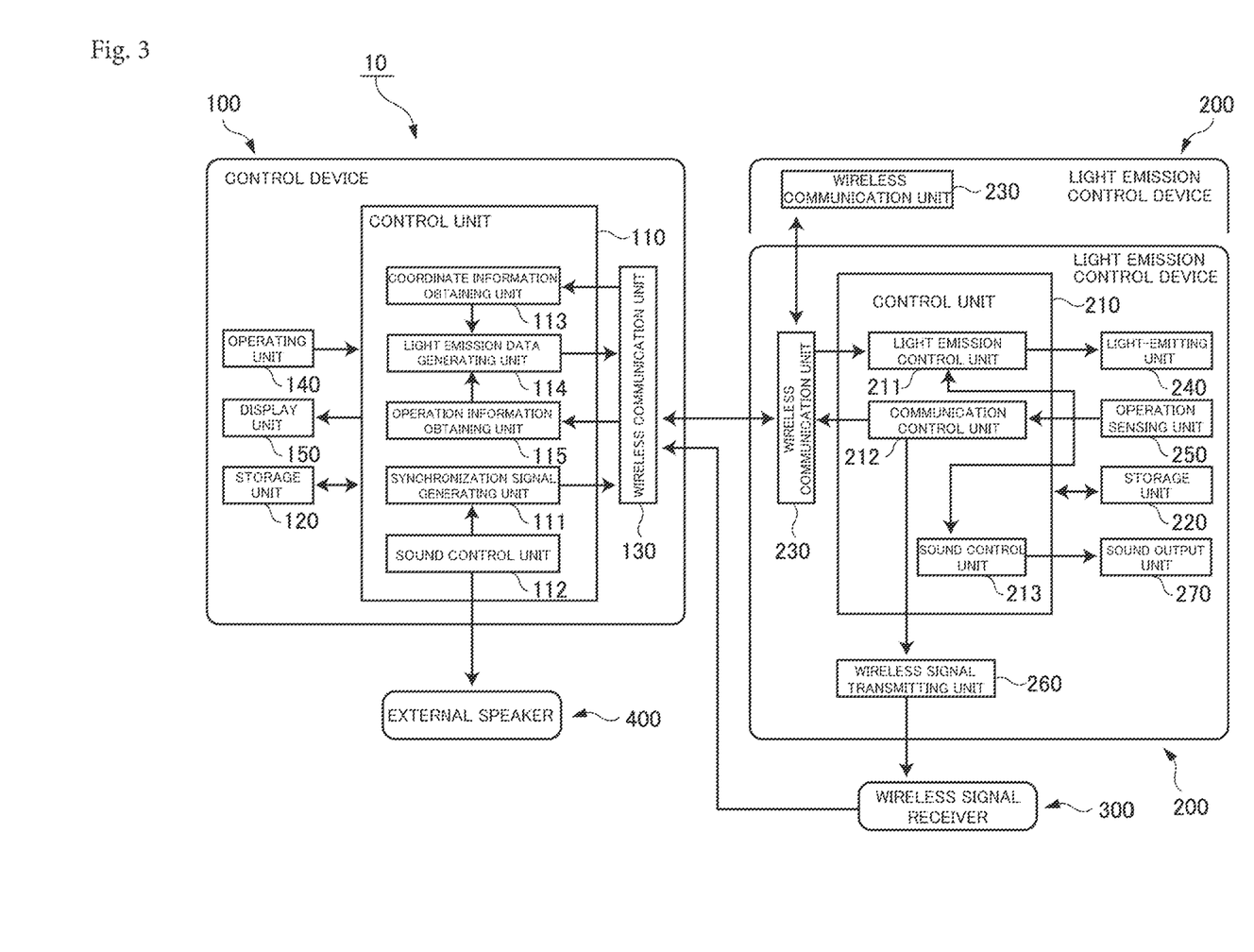
FIG. 3 is a block diagram illustrating a functional configuration of each device.

FIG. 3 illustrates function blocks of various devices constituting the staging system 10. The following describes the functional configurations of the various devices in detail with reference to FIG. 3.

The control device 100 is a computer that controls the entire system, such as control of the internal device 200 inside each ball 2. The control device 100 is preferably installed in the event venue where the staging apparatuses 1 or the like are disposed. Meanwhile, for example, a web server connected to the Internet can achieve the function of a control unit 110. In this meaning, the control device 100 is not limited to one constructed by one computer and may be one constructed by decentralizing the functions into a plurality of computers (for example, a local terminal and a web server).

The control device 100 includes the control unit 110, a storage unit 120, a wireless communication unit 130, an operating unit 140, and a display unit 150. A processor, such as a CPU or a GPU, is usable as the control unit 110. The control unit 110 reads a program stored in the storage unit 120 and performs predetermined arithmetic processing in accordance with this program and controls another element. The storage unit 120 stores various pieces of data required for the arithmetic processing in the control unit 110. A non-volatile memory, such as an HDD and an SDD, can achieve the storage function of the storage unit 120. Additionally, the storage unit 120 may have a function as a memory to write or read, for example, an interim progress of the arithmetic processing by the control unit 110. A volatile memory, such as a RAM and a DRAM, can achieve the memory function of the storage unit 120. The wireless communication unit 130 is a communication interface for transmission and reception of information with the internal device 200. For example, a wireless LAN router for communications following the known wireless communication standard, such as Wi-Fi (registered trademark) can be employed as the wireless communication unit 130. The operating unit 140 includes an input device, such as a computer mouse, a keyboard, a touchscreen, and a microphone, and inputs operation information by a person to the control unit 110. The display unit 150 is a display device, such as a liquid crystal display and an organic EL display. The display unit 150 may be integrated with the operating unit 140 to constitute a touch panel display.

Additionally, the control unit 110 in the control device 100 includes a synchronization signal generating unit 111, a sound control unit 112, a coordinate information obtaining unit 113, a light emission data generating unit 114, and an operation information obtaining unit 115. These various functional units may be achieved by software or may be achieved by hardware.

The synchronization signal generating unit 111 generates a synchronization signal transmitted to the plurality of respective staging apparatuses 1. The synchronization signal is a signal to synchronize timings at which the respective staging apparatuses 1 output sounds, such as the sound effects, and the same synchronization signal is simultaneously transmitted to the respective staging apparatuses 1. Specifically, the synchronization signal defines the timing at which the sound can be output, and, for example, permits each staging apparatus 1 to output the sound at a constant tempo. The synchronization signal generated by the synchronization signal generating unit 111 is concurrently transmitted to the internal devices 200 in the respective staging apparatuses 1 via the wireless communication unit 130.

The sound control unit 112 controls driving of the external speaker 400 coupled to the control device 100. The sound control unit 112 reads sound content data, such as BGM, from the storage unit 120 and controls the external speaker 400 in accordance with the sound content data to output, for example, the BGM. The external speaker(s) 400 are disposed at one or a plurality of positions in the event venue and is output, for example, the BGM, in the venue in accordance with the control by the sound control unit 112. The sound control unit 112 may extract a tempo (BPM) of the sound content data read from the storage unit 120 and provide the tempo to the synchronization signal generating unit 111. In this case, the synchronization signal generating unit 111 generates the synchronization signal corresponding to the tempo (BPM) of the sound content data. For example, in a case where the tempo of the BGM played from the external speaker 400 is 100 bpm, the synchronization signal generating unit 111 may generate the synchronization signal with the tempo (100 bpm) same as that of the BGM, or may generate the synchronization signal 1/n times (n=integer of two or more) that of the BGM. Note that the n is preferably around 2 to 4. In view of this, the tempo of the BGM output from the external speaker 400 can be matched with the timing of the sound effect (SE) output from each staging apparatus 1, and therefore, unified music can be played in the entire venue.

The coordinate information obtaining unit 112 obtains the respective positional coordinates of the plurality of staging apparatuses 1. In this embodiment, the plurality of wireless signal receivers 300 receive a wireless signal transmitted by the internal device 200 in the specific staging apparatus 1, and thus the control device 200 calculates the positional coordinate of the internal device 200. However, the positional coordinate of each staging apparatus 1 may be calculated by each internal device 200 and may be provided to the coordinate information obtaining unit 112 in the control device 100. The light emission data generating unit 114 generates light emission data (control information) to control the light-emitting unit 240 in each staging apparatus 1. The light emission data generating unit 114 may read the light emission data preliminarily stored in the storage unit 120 or may generate the light emission data in real time. Additionally, the light emission data generating unit 114 may determine the light emission data provided to the staging apparatus 1 according to the positional coordinate of each staging apparatus 1. That is, a light emission state of the light-emitting unit 240 changes according to the position of each staging apparatus 1. The operation information obtaining unit 115 obtains the operation information of the ball 2 by communications with the internal device 200. The operation information obtained here is usable to generate the light emission data in the light emission data generating unit 114.

The internal device 200 controls the light emission state of the light-emitting unit 240 included in a ball 22 and the timing at which the sound output unit 270 outputs the sound in accordance with the control by the control device 100. The internal device 200 is mounted to each of the plurality of balls 2 to ensure giving and receiving the information with the control device 100 and also to ensure mutual communications between the internal devices 200 by a peer-to-peer method. For example, the operation information of the ball 2 sensed by a certain internal device 200 can be transmitted to another internal device 200, or the control information (for example, the synchronization signal and the light emission data) received from the control device 100 can be transferred from a certain internal device 200 to another internal device 200. Basically, although the control device 100 provides the internal device 200 with the synchronization signal of the sound and the light emission data, transferring the synchronization signal of the sound and the light emission data between the internal devices 200 allows wholly and quickly distributing the pieces of the control information throughout the plurality of internal devices 200.

The internal device 200 includes a control unit 210, a storage unit 220, a wireless communication unit 230, the light-emitting unit 240, an operation sensing unit 250, a wireless signal transmitting unit 260, and the speaker 270. Note that, although the illustration in FIG. 3 is omitted, the ball 2 internally includes a battery to supply the internal device 200 with electric power.

The control unit 210 is a processor, such as a CPU or a GPU. The control unit 210 reads a program stored in the storage unit 220 and performs predetermined arithmetic processing in accordance with this program and controls another element.

The storage unit 220 stores various pieces of data required for the arithmetic processing by the control unit 210 and sound data (for example, the sound effect and the BGM) output from the sound output unit (speaker) 270. The storage unit 220 in the internal device 200 stores identification information (ID information) unique to the internal device 200. The storage unit 220 can be achieved by the non-volatile memory, such as an HDD and an SDD, and a volatile memory, such as a RAM and a DRAM.

The wireless communication unit 230 is a communication interface for transmission and reception of information between the control device 100 and another internal device 200 and performs communications following the known wireless communication standards, such as Wi-Fi (registered trademark) and Bluetooth (registered trademark). The wireless communication unit 230 in the internal device 200 receives the synchronization signal of the sound and the light emission data from the control device 100. Additionally, the wireless communication unit 230 can transmit, for example, the operation information of the ball 2 to the control device 100.

The light-emitting unit 240 is constituted of a light-emitting device, such as a LED. For example, the light-emitting unit 240 includes each one or a plurality of a red LED, a green LED, and a blue LED and is configured to emit lights with multi tone colors at various kinds of luminance.

The operation sensing unit 250 is constituted of various sensors to sense the operation of the ball 2. For example, as the operation sensing unit 250, one of an acceleration sensor to measure acceleration, a tilt sensor (for example, a gyro sensor) to measure a tilting angle and an angular velocity, a vibration sensor to sense a vibration of the ball 2, or the like can be used, or a plurality of them can be used in combination.

The wireless signal transmitting unit 260 transmits a wireless signal including one's own identification information, and the plurality of wireless signal receivers 300 installed in the venue receive this wireless signal. The wireless signal transmitting unit 260 transmits the wireless signal following the known standard for short-range wireless communications, such as Bluetooth (registered trademark). When the plurality of wireless signal receivers 300 receive the wireless signal, the wireless signal receivers 300 or the control device 100 can measure distances from the internal devices 200 to the wireless signal receivers 300.

The sound output unit 270 outputs the sound, such as the sound effect and the BGM, in accordance with the control by the control unit 210 based on the sound data stored in the storage unit 220. As the sound output unit 270, the known speaker is appropriately usable.

Additionally, the control unit 210 in the internal device 200 includes a light emission control unit 211, a communication control unit 212, and a sound control unit 213. These respective functional units may be achieved by software or may be achieved by hardware. The light emission control unit 211 controls the light emission state of the light-emitting unit 240, such as the LED, based on the light emission data received from the control device 110. The communication control unit 212 performs control to transmit the information sensed by the operation sensing unit 250 to the control device 100 and another internal device 200 via the wireless communication unit 230 and to transmit the identification information stored in the storage unit 220 via the wireless signal transmitting unit 260. The sound control unit 213 controls the sound output unit 270 based on the synchronization signal received from the control device 100 and causes the sound output unit 270 to output the sound data, such as the sound effect and the BGM, stored in the storage unit 220 at the timing in accordance with this synchronization signal.

Figure 4:
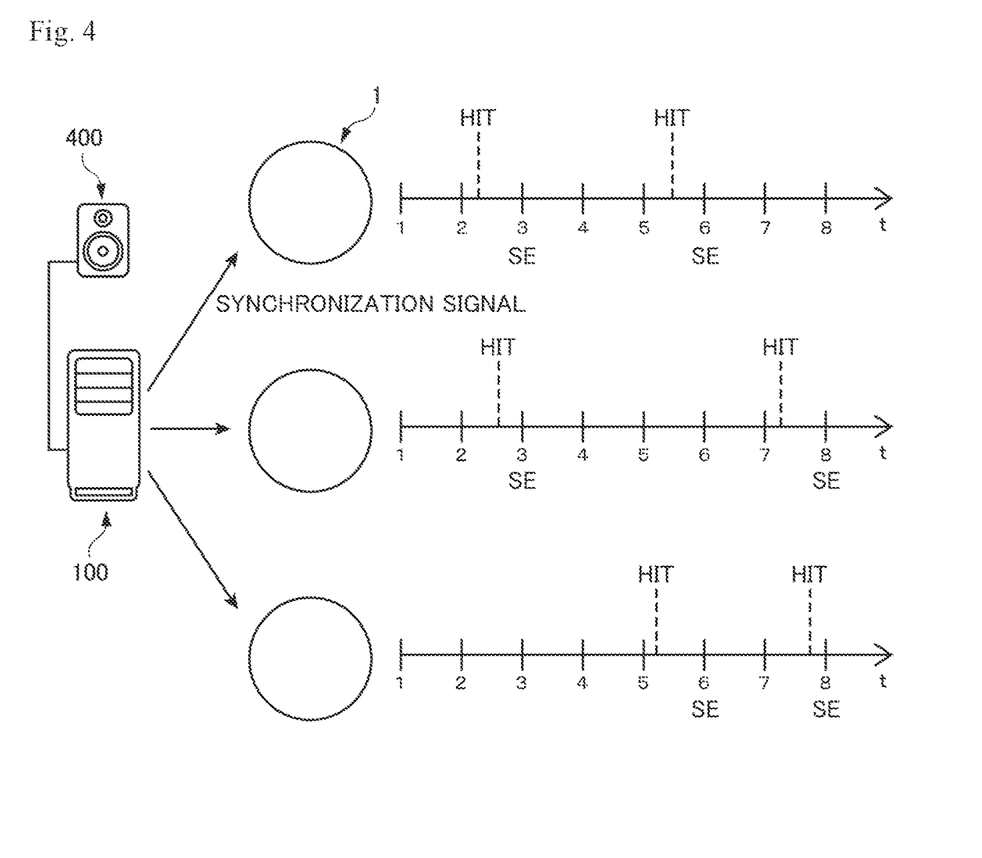
FIG. 4 illustrates one example of a method that synchronizes timings of sound effects (SE) output from the respective staging apparatuses using a synchronization signal.

Here, with reference to FIG. 4, the following describes a method that synchronizes the sounds output from the plurality of staging apparatuses 1 (internal devices 200). As illustrated in FIG. 4, the control device 100 concurrently transmits the synchronization signal to the respective staging apparatuses 1. As illustrated in FIG. 4, the synchronization signal is to define the timing at which the staging apparatus 1 outputs, for example, the sound effect (SE), and the staging apparatus 1 is permitted to output the sound effect (SE) only at the timing according to a specific tempo. For example, FIG. 4 schematically illustrates an example of the synchronization signal of one beat to eight beats at regular intervals. For example, assume that the operation sensing unit 250 in the first staging apparatus 1 senses the operation of the ball 2 at a timing between the second beat and the third beat. In this case, the first staging apparatus 1 does not immediately output the sound effect (SE) but outputs the sound effect (SE) at a timing of matching with the third beat of the synchronization signal. Similarly, in a case where the operation sensing unit 250 in the second staging apparatus 1 senses the operation of the ball 2 at a timing between the second beat and the third beat, the sound effect (SE) is output at a timing of matching with the third beat of the synchronization signal. In the example illustrated in the drawing, although the timings at which the operation sensing units 250 in the first staging apparatus 1 and the second staging apparatus 1 sense the operations of the balls 2 are different in a precise sense, as described above, outputting the sound effects in accordance with the synchronization signal allows approximately matching the timings at which the sound effects are output from both staging apparatuses 1. Thus, by concurrently transmitting the synchronization signal to the respective staging apparatuses 1, the timings at which the respective staging apparatuses 1 output the sound effects can be synchronized.

Next, the following describes an example of a process that the control device 100 obtains the positional coordinates of the plurality of staging apparatuses 1 (internal devices 200) in detail. The plurality of wireless signal receivers 300 are equipped in the outdoor or indoor event venue, and unique ID information (identification) is assigned for each receiver 300. Additionally, the wireless signal transmitting unit 260 in the internal device 200 always transmits a wireless signal including unique identification information. The wireless signal receivers 300 each receive the wireless signal transmitted by the internal device 200. Note that the wireless signal transmitted by the internal device 200 is for short-range communications, and therefore only the wireless signal receiver 300 positioned near the internal device 200 (within a range in which the wireless signal reaches) receives the wireless signal. Additionally, the wireless signal receiver 300 that receives the wireless signal from the internal device 200 transmits information on the wireless signal to the control device 100. The storage unit 120 in the control device 100 stores coordinate information in the event space where the respective receivers 300 are installed associated with the ID information of each wireless signal receiver 300. Thus, a positional coordinate obtaining unit 112 in the control device 100 refers to the ID information of the wireless signal receiver 300, thereby ensuring identifying the positional coordinate of the wireless signal receiver 300 that has received the wireless signal from the internal device 200.

The wireless signal receiver 300 can measure the received intensity of the wireless signal. When the wireless signal receiver 300 provides the information on the received intensity of the wireless signal to the control device 100, a location information acquiring unit 112 in the control device 100 allows calculating the distance from the wireless signal receiver 300 to the internal device 200 based on the information on the received intensity. Note that the wireless signal receiver 300 may be caused to calculate the distance to the internal device 200 and provide the information on the obtained distance to the control device 100. Thus, the location information acquiring unit 112 in the control device 100 obtains a coordinate position of the wireless signal receiver 300 that has received the wireless signal from the internal device 200 and the distance from the internal device 200 to the wireless signal receiver 300. When the two or more wireless signal receivers 300 simultaneously receive the wireless signal transmitted by the internal device 200, the positional coordinate obtaining unit 112 can obtain a two-dimensional coordinate (x, y) or a three-dimensional coordinate (x, y, z) of the current position of the internal device 200 that transmits the wireless signal using a triangulation method, based on the coordinate positions of the two or more wireless signal receivers 300 and the distances from the receivers 200 to the internal device 200. Thus, the positional coordinate obtaining unit 112 in the control device 100 allows obtaining (calculating) the information on the current coordinate position of each internal device 200 in real time. Additionally, the control device 100 may transmit the information on the current coordinate position of each internal device 200 to each internal device 200.

While the control device 100 performs the arithmetic processing of the coordinate position of the internal device 200 in the above-described description, it is possible that the internal device 200 itself is caused to obtain the coordinate position of itself and transmits the obtained coordinate position from the internal device 200 to the control device 100. For example, when the balls are operated outdoor, a GPS measuring device may be disposed in each internal device 200 to measure the two-dimensional coordinate (x, y) of the current position in each internal device.

The light emission data generating unit 114 can determine the light emission state of a light-emitting unit 250 in the internal device 200 based on the current coordinate position of each staging apparatus 1 (internal device 200) obtained as described above. Specifically, according to the current coordinate position of each staging apparatus 1 in the actual space, the light emission data generating unit 114 provides the light emission data to control the light emission state of the light-emitting unit 240 to each staging apparatus 1. This allows the uniform lighting staging according to the current position information of each staging apparatus 1. For example, the inside of the event venue can be divided into a plurality of areas, and colors of the staging apparatuses 1 belonging to a certain area can be set to similar colors or the emitted light colors and emission intensity can be controlled in gradation in the entire event venue.

The light emission data generating unit 114 determines the light emission state of each staging apparatus 1 as described above, and generates the unique light emission data (or reads from the storage unit 120) provided to each staging apparatus 1 according to the result of the determination. Since the light emission situation of the light-emitting unit 240 in each internal device 200 is controlled for a certain period of time, the light emission data is preferably timeline format data. The internal device 200 controls the light emission state of the light-emitting unit 240 for a defined period in accordance with the light emission data. Since the staging apparatus 1 is assumed to move in the space, the light emission data is preferably generated frequently at every short period. For example, the period during which the light emission state is controlled by one piece of light emission data is preferably from 1 second to 60 seconds and especially preferably from around 10 seconds to 30 seconds. The light emission data includes, for example, the ID information unique to the internal device 200, information to designate a time point when the emission of light starts, information to designate the light emission state, and information to designate a time point when the emission of light ends. Thus, the light emission data for each staging apparatus 1 generated by the light emission data generating unit 114 is transmitted to the internal device 200 in each staging apparatus 1 through the wireless communication unit 130.

When the internal device 200 in each staging apparatus 1 receives the light emission data from the control device 100, the light emission control unit 211 controls the light emission state of the light-emitting unit 240 in accordance with this light emission data. For example, the light emission control unit 211 may once store the received light emission data in the storage unit 220 and repeatedly perform the control in accordance with the same light emission data until the internal device 200 receives the next light emission data from the control device 100.

Figure 5:
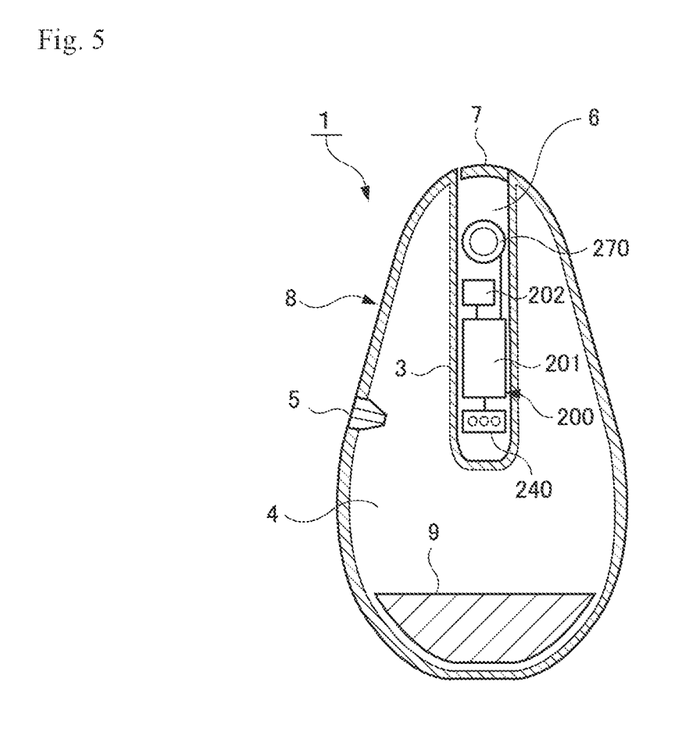
FIG. 5 schematically illustrates a cross-sectional structure of a swing body type staging apparatus.

Subsequently, with reference to FIG. 5 and FIG. 6, the following describes an embodiment in a case where the internal device 200 in the staging apparatus 1 is housed inside a swing body 8, instead of the ball 2. FIG. 5 illustrates the embodiment of the staging apparatus 1 where the internal device 200 is included inside the swing body 8. Note that the function and the configuration of the internal device 200 are same as the ones described above. As illustrated in FIG. 5, the swing body 8 has a bowl-shaped (for example, a hemispherical-shaped) bottom surface in contact with a ground and a floor and a weight member 9 is mounted to an inner bottom surface. Thus, the swing body 8 is formed to rise up even when falling over like a self-righting doll.

The swing body 8 is a hollow spherical body internally containing a gas, such as air, nitrogen, and helium, and is made of flexible, elastic material that is transparent or semitransparent such that light irradiated from the inside transmits. Examples of the material forming the swing body 8 include silicone and synthetic rubber. A size of the swing body 8 is not especially limited, and the swing body 8 only needs to have the size that the swing body 8 can internally include the light-emitting unit of the internal device 200. However, the swing body 8 preferably has a height at which a standing spectator can easily touch its upper portion. The swing body 8 preferably has the height of 0.5 m or more or 1 m or more, and, for example, the height is preferably from 0.5 m to 3 m or from 1 m to 2 m.

In this system, the swing body 8 has the bowl-shaped (hemispherical-shaped) bottom surface, and the weight member 9 is disposed on the inner bottom surface. A shape of the swing body 8 on the upper side with respect to the bowl-shaped portion is not especially limited. As illustrated in FIG. 5, the swing body 8 may have an egg shape as a whole, or may have a shape like a punching bag constituted of a bowl-shaped bottom surface and a cylindrical-shaped upper portion. A weight and an installation position of the weight member 9 are adjusted such that the entire swing body 8 can rise up while its bottom surface in contact with the ground and the floor even when the swing body 8 falls over. Examples of the weight member 9 include a sandbag, a water bag, and a metal material, such as lead, but its material is not especially limited. The weight member 9 preferably has the weight heavier than that of the entire swing body 8.

Besides, as illustrated in FIG. 5, similarly to the above-described ball 2, the swing body 8 has the internal space separated into the gas chamber 4 and the device chamber 6 by the partition wall. That is, the gas chamber 4 is the room filled with air, such as air and nitrogen, and the air hole 5 is provided in the outer film constituting the swing body 8. The air hole 5 preferably includes a check valve to avoid the gas inside the gas chamber 4 to easily leak. The partition wall 3 extends from the outer film constituting the swing body 8 to the center of the ball 2. The partition wall 3 preferably reaches at least up to the center of the swing body 8 such that the light-emitting unit 240 can be disposed on the approximately center of the swing body 8. The internal device 200 is disposed inside the device chamber 6. The internal device 200 includes the board 201 on which, for example, a CPU and a control circuit, various memories, and various sensors are mounted, the battery 202, the light-emitting unit 240, such as an LED, and the sound output unit 270, such as a speaker. The internal device 200 is fixed to the partition wall 3 or the like forming the device chamber 6. Additionally, the device chamber 6 has the opening from which the internal device 200 can be taken out or taken in, and the opening is covered with the lid portion 7 in a usual state. The lid portion 7 can be mounted to the outer film of the swing body 8 with, for example, a hook-and-loop fastener or a button. By covering the opening in the device chamber 6 by the lid portion 7, directly viewing the internal device 200 from the outside is difficult. Additionally, in the swing body 8, the peripheral area of the device chamber 6 is surrounded by the gas chamber 4 excluding the part where the opening is formed. The gas chamber 4 preferably occupies from 60% to 95% or from 80% to 95% to a volume of the entire swing body 8 (the sum of the volumes of the gas chamber 4 and the device chamber 6).

In this embodiment as well, when the operation sensing unit 250 senses the operation of the swing body 8, the sound control unit 213 in the internal device 200 causes the sound output unit 270 to output, for example, the sound effect. Specifically, as described above, when the operation sensing unit 250 senses the operation of the swing body 8, the sound control unit 213 in the internal device 200 causes the sound output unit 270 to output, for example, the sound effect at the timing based on the synchronization signal received from the control device 100.

Next, the following describes a process to change the light emission state according to the operation of the swing body 8. The internal device 200 includes the operation sensing unit 250 constituted of, for example, an acceleration sensor and a tilt sensor. When the spectator strongly pushes or hits the swing body 8, the operation sensing unit 250 measures the acceleration or angular velocity to sense the operation of the swing body 8. When the operation sensing unit 250 senses the rapid operation (specifically, an amount of change of the acceleration or the angular velocity exceeding a predetermined threshold) of the swing body 8, the light emission control unit 211 may change the light emission state of the light-emitting unit 240 irrespective of the light emission data. For example, the light emission control unit 211 may randomly change, for example, the emitted light color of the light-emitting unit 240 or flash the light-emitting unit 240 while the operation is sensed, thus ensuring appropriately changing the light emission state.

Moreover, a method that changes the light emission state of the light-emitting unit 240 when the rapid operation of the swing body 8 is sensed in the internal device 200 may be defined in the light emission data generated by the control device 100. For example, the color to be changed of the light-emitting unit 240 or the like when the rapid operation of the swing body 8 is sensed can be preliminarily defined in the light emission data. In this case, the light emission control unit 211 only needs to change the light emission state of the light-emitting unit 240 in accordance with the light emission data when the rapid operation of the swing body 8 is sensed.

Further, when a certain internal device 100 senses the rapid operation of the swing body 8, the light emission control unit 211 can transmit sensing information of the operation to another internal device 100 via the wireless communication unit 230 by the peer-to-peer method, in addition to changing the light emission state of own light-emitting unit 240. In this case, the other internal device 100 that has received the sensing information changes the light emission state of own light-emitting unit 240 based on the sensing information. This allows changing the light emission state of other staging apparatuses 1 (swing bodies 8) in conjunction with the operation of a certain staging apparatus 1 (swing body 8). Additionally, connecting the internal devices 100 mutually by the peer-to-peer method allows coordinating the internal devices 100 mutually without via the control device 100, and therefore the coordination of the change in light can be speeded up.

Figure 6:
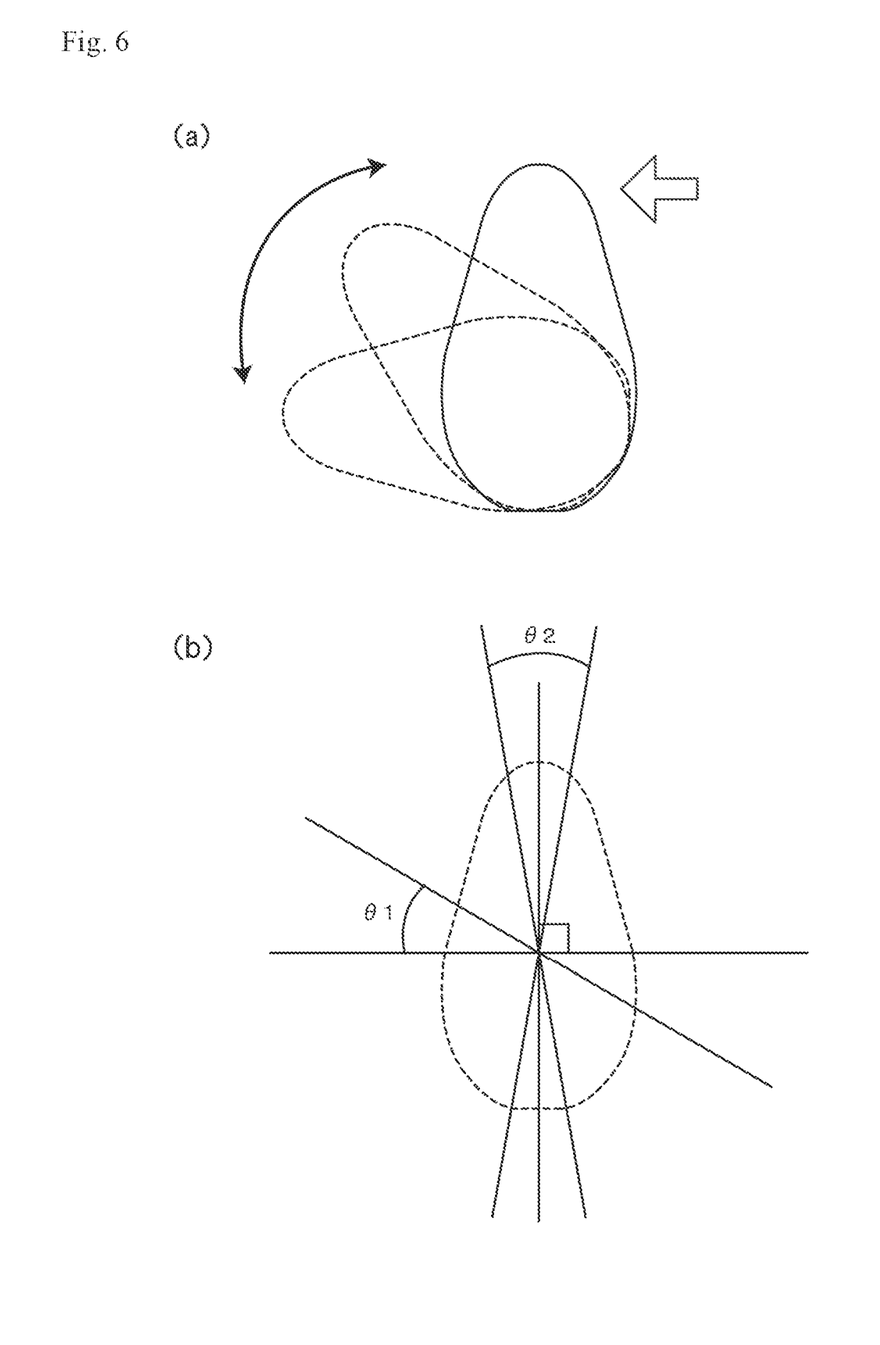
FIG. 6 schematically illustrates one example of an operation of a swing body.

FIG. 6 illustrates one example of the operation of the swing body 8. As illustrated in FIG. 6(*a*), since the swing body 8 has the bowl-shaped bottom surface, the swing body 8 falls over when being pushed or hit by the spectator. However, since the weight member is disposed near the bottom surface, the swing body 8 rises up by its weight.

FIG. 6(*b*) schematically illustrates a tilting angle of the swing body 8. A reference numeral θ1 indicated in FIG. 3 (6) indicates a tilting angle range of the swing body 8 with respect to a horizontal direction (specifically, the ground and the floor). An example of the angle range θ1 is from 10 to 45 degrees or from 0 to 30 degrees. For example, it is defined that even when the operation sensing unit 250 (specifically, the acceleration sensor) senses the rapid operation in the state where the operation sensing unit 250 (specifically, the tilt sensor) in the internal device 200 senses that the tilting angle of the swing body is in the angle range θ1, the light emission state of the light-emitting unit 240 does not change. That is, there may be a case where when the spectator strongly pushes the upper portion of the swing body 8, the swing body 8 receives the first impact by the pushing operation by the spectator and when the swing body 8 contacts the ground after that, the swing body 8 receives the second impact. In such a case, the angle range θ1 to turn OFF the change in light emission state is preliminarily defined such that the light emission state is changed when the swing body 8 receives the first impact from the spectator and the light emission state is not changed when the swing body 8 receives the second impact due to the contact with the ground.

Note that, instead of the angle range θ1 to turn OFF the change in light emission state as described above, an angle range θ2 to turn ON the change in light emission state may be defined. That is, the reference numeral θ2 indicated in FIG. 6(*b*) indicates a tilting angle range of the swing body with respect to an extension direction. For example, the angle range θ2 is from 10 to 45 degrees or from 0 to 30 degrees. For example, it is defined that only when the operation sensing unit 250 (specifically, the tilt sensor) in the internal device 200 senses that the tilting angle of the swing body is in the angle range θ2, the light emission state of the light-emitting unit 240 changes when the operation sensing unit 250 (specifically, the acceleration sensor) senses the rapid operation. Thus, the angle range at which the light emission state can be changed may be preliminarily defined.

Additionally, when the light emission state of the light-emitting unit 240 is changed, the sound, such as the sound effect, may be simultaneously output from the sound output unit 270. That is, when the operation sensing unit 250 senses the rapid operation (specifically, the amount of change in acceleration or angular velocity exceeding the predetermined threshold) of the swing body 8, the sound control unit 213 causes the sound output unit 270 to output the sound, such as the sound effect, based on the sound data stored in the storage unit 220. Whenever the swing body operates, the sound output from the sound output unit 270 may be changed or a constant sound may be output continuously. The sound output from the speaker may be changed according to the tilting angle of the swing body 8.

In the present description, the embodiments of the present invention have been described above by referring to the drawings to express the contents of the present invention. However, the present invention is not limited to the above-described embodiments and encompasses changed forms and improved forms obvious for those skilled in the art based on the matters described in the present description.

INDUSTRIAL APPLICABILITY

The present invention relates to a staging apparatus, such as a self-righting doll, a lighting staging system using the same, and a lighting staging method. Therefore, the present invention is preferably usable for the entertainment industry, such as an outdoor event, a concert, and a live concert.

DESCRIPTION OF REFERENCE SIGNS

1 . . . staging apparatus
2 . . . ball
3 . . . partition wall
4 . . . gas chamber
5 . . . air hole
6 . . . device chamber
7 . . . lid portion
8 . . . swing body
9 . . . weight member
10 . . . staging system
100 . . . control device
110 . . . control unit
111 . . . synchronization signal generating unit
112 . . . sound control unit
113 . . . coordinate information obtaining unit
114 . . . light emission data generating unit
115 . . . operation information obtaining unit
120 . . . storage unit
130 . . . wireless communication unit
140 . . . operating unit
150 . . . display unit
200 . . . internal device
210 . . . control unit
211 . . . light emission control unit
212 . . . communication control unit
213 . . . sound control unit
220 . . . storage unit
230 . . . wireless communication unit
240 . . . light-emitting unit
250 . . . operation sensing unit
260 . . . wireless signal transmitting unit
270 . . . sound output unit
300 . . . wireless signal receiver

The invention claimed is:

1. A staging apparatus comprising:
a ball containing a gas; and
an internal device including a light-emitting unit and a sound output unit disposed in the ball;
wherein the internal device further includes a wireless communication unit configured to receive control information of the light-emitting unit or the sound output unit transmitted from an external control device or another staging apparatus;
the light-emitting unit or the sound output unit is configured to drive in accordance with the control information; and
wherein the control information includes a synchronization signal to synchronize timings at which the sound output units output sounds.

2. The staging apparatus according to claim 1, wherein the internal device further includes:
an operation sensing unit configured to sense an operation of the ball; and
a sound control unit configured to output a sound from the sound output unit when the operation sensing unit senses the operation of the ball.

3. The staging apparatus according to claim 1, wherein the ball includes:
a gas chamber having an air hole for injecting a gas; and
a device chamber that is separated from the gas chamber and is provided the internal device.

4. A staging apparatus comprising:
a swing body that has a bowl-shaped bottom surface and is disposed a weight member on an inner side of the bottom surface; and
an internal device including a light-emitting unit and a sound output unit disposed in the swing body;
wherein the internal device further includes a wireless communication unit configured to receive control information of the light-emitting unit or the sound output unit transmitted from an external control device or another staging apparatus;
the light-emitting unit or the sound output unit is configured to drive in accordance with the control information; and
wherein the control information includes a synchronization signal to synchronize timings at which the sound output units output sounds.

5. A lighting staging system comprising:
a plurality of the staging apparatuses, wherein each of the plurality of the staging apparatuses comprises:
a swing body that has a bowl-shaped bottom surface and is disposed a weight member on an inner side of the bottom surface; and
an internal device including a light-emitting unit and a sound output unit disposed in the swing body;
wherein the internal device further includes:
an operation sensing unit configured to sense an operation of the swing body, and
a sound control unit configured to output a sound from the sound output unit when the operation sensing unit senses the operation of the swing body; and
a control device configured to control the staging apparatuses, wherein
the control device is configured to transmit a synchronization signal to synchronize timings at which the sounds are output units to the staging apparatuses, and
the staging apparatuses are configured to output the sounds from the sound output units at a timing based on the synchronization signal when the operation sensing units sense the operations.

6. A lighting stage system comprising:
a plurality of the staging apparatuses; wherein each of the plurality of the staging apparatuses comprises:
a ball containing a gas; and
an internal device including a light-emitting unit and a sound output unit disposed in the ball; wherein the internal device further includes:
an operation sensing unit configured to sense an operation of the ball; and
a sound control unit configured to output a sound from the sound output unit when the operation sensing unit senses the operation of the ball; and
a control device configured to control the staging apparatuses, wherein
the control device is configured to transmit a synchronization signal to synchronize timings at which the sounds are output from the sound output units to the staging apparatuses, and
the staging apparatuses are configured to output the sounds from the sound output units at a timing based on the synchronization signal when the operation sensing units sense the operations.

7. A lighting staging method performed by a plurality of the staging apparatuses; wherein each of the plurality of the staging apparatuses comprises:
a ball containing a gas; and
an internal device including a light-emitting unit and a sound output unit disposed in the ball; wherein the internal device further includes:
an operation sensing unit configured to sense an operation of the ball; and
a sound control unit configured to output a sound from the sound output unit when the operation sensing unit senses the operation of the ball; and a control device configured to control the staging apparatuses, the method comprising:
a step of transmitting a synchronization signal to synchronize timings at which the sounds are output from the sound output units by the control device to the staging apparatuses; and
a step of outputting the sounds from the sound output units by the staging apparatuses at a timing based on the synchronization signal when the operation sensing units sense the operations.

8. A lighting staging method performed by a plurality of the staging apparatuses; wherein each of the plurality of the staging apparatuses comprises:
a swing body that has a bowl-shaped bottom surface and is disposed a weight member on an inner side of the bottom surface; and
an internal device including a light-emitting unit and a sound output unit disposed in the swing body; wherein the internal device further includes:
an operation sensing unit configured to sense an operation of the swing body, and
a sound control unit configured to output a sound from the sound output unit when the operation sensing unit senses the operation of the swing body; and
a control device configured to control the staging apparatuses; the method comprising:

a step of transmitting a synchronization signal to synchronize timings at which the sounds are output from the sound output units by the control device to the staging apparatuses; and a step of outputting the sounds from the sound output units by the staging apparatuses at a timing based on the synchronization signal when the operation sensing units sense the operations.

* * * * *